(12) United States Patent
Hogberg et al.

(10) Patent No.: US 7,136,654 B1
(45) Date of Patent: Nov. 14, 2006

(54) POWER BASED CHANNEL ASSIGNMENT IN A WIRELESS COMMUNICATION SYSTEM

(75) Inventors: Shawn W. Hogberg, Chandler, AZ (US); Thomas P. Emmons, Jr., Mesa, AZ (US); Robert Peters, Silver Spring, MD (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/398,307

(22) Filed: Sep. 20, 1999

(51) Int. Cl.
*H04Q 7/20* (2006.01)

(52) U.S. Cl. .................. 455/450; 455/451; 455/455; 370/318; 370/329; 370/437

(58) Field of Classification Search ........... 370/328, 370/329, 335, 336, 337, 342, 347, 437 V, 370/441, 442, 465, 468, 318, 332, 431; 455/450, 455/451, 452, 455, 427, 12.1, 13.4, 509, 455/516, 522, 188.1, 226.2
See application file for complete search history.

(56) References Cited

U.S. PATENT DOCUMENTS

| | | | | |
|---|---|---|---|---|
| 5,749,044 A | * | 5/1998 | Natarajan et al. | 455/13.1 |
| 5,758,090 A | * | 5/1998 | Doner | 370/335 |
| 6,104,708 A | * | 8/2000 | Bergamo | 370/342 |
| 6,160,801 A | * | 12/2000 | Uchida et al. | 370/337 |
| 6,272,325 B1 | * | 8/2001 | Wiedeman et al. | 455/13.4 |

\* cited by examiner

*Primary Examiner*—Jean Gelin

(57) ABSTRACT

A communications platform (100) assigns communication channels (58, 78) to users based on a power level associated with the individual users. An available bandwidth for use by the communications platform (100) in segmented into a number of sub-bands using a bank of filters (54, 78). A number of independent communication channels (58, 78) are then provided within each of the sub-bands using an appropriate multiple access scheme (e.g., code division multiple access). A power range is then specified for each of the sub-bands. When a communication connection is to be established, a power level associated with the connection is determined. One or more sub-bands are then identified that have power ranges encompassing the determined power level. A channel is then assigned to the communication connection from one of the identified sub-bands.

62 Claims, 6 Drawing Sheets

POWER BASED CHANNEL ASSIGNMENT IN A WIRELESS COMMUNICATION SYSTEM

FIELD OF THE INVENTION

The invention relates generally to wireless communication systems and, more particularly, to techniques for assigning channels in wireless communication systems.

BACKGROUND OF THE INVENTION

Code division multiple access (CDMA) is a signal coding scheme that allows multiple independent communications channels to occupy the same frequency band at the same time with overlapping signal spectra. To achieve this, the communication signal within each of the channels is modulated with a unique code (e.g., a pseudo noise code) that spreads the spectrum of the communication signal and that is uncorrelated to (e.g., orthogonal to) the codes used in the other channels. The lack of correlation between different channel codes allows each of the communication signals to be recovered from a composite receive signal by correlating the receive signal with a corresponding code. CDMA techniques are capable of providing a significant increase in communication system capacity within a given available bandwidth.

To maximize capacity in a CDMA based system, the power levels used in the various channels have to be substantially equal. This is because each of the channels appears as noise to each of the other channels during the correlation process. Thus, if the power level of signals in one of the channels is increased, the noise experienced by each of the other channels is correspondingly increased. This increase in noise will compromise accurate correlation in the other channels. Therefore, to reduce the noise in the other channels, the overall number of channels, and thus the capacity of the system, must be reduced.

Some communication systems, such as satellite-based systems, require power consumption to be minimized. These systems ordinarily achieve this power conservation by tailoring transmit power levels to the individual remote entities they are communicating with. For example, a communications satellite will generally communicate with a large number of terrestrial users simultaneously. Each of these users will have different power requirements due to, for example, varying levels of obstruction in the propagation paths between the satellite and the terrestrial users (i.e., different levels of shadowing). To communicate with users that are heavily shadowed, the satellite needs to transmit relatively high power levels. To communicate with slightly shadowed or non-shadowed users, the satellite can transmit relatively low power levels. If the satellite transmitted the same power level to all of the terrestrial users, more power would be expended on the slightly shadowed users than was necessary for accurate communication. Thus, in the past, a tradeoff was generally made between communications capacity and power efficiency in CDMA communications systems. Therefore, a need exists for a communication system that can efficiently process communications at various power levels. The communication system will preferably be capable of achieving an enhanced level of power efficiency without significantly reducing system capacity.

DETAILED DESCRIPTION OF A PREFERRED EMBODIMENT

The invention relates to a communication system that is capable of efficiently processing communications at a variety of different power levels. The system utilizes a combination of multiple access methods to generate a number of independent communication channels within an available bandwidth (e.g., a bandwidth licensed for use between a communications platform and a plurality of remote entities). The communication channels are then divided into a number of different channel groups. A power condition (e.g., a range of operative channel power levels) is then specified for each of the channel groups. Communication within each of the channel groups is then limited to signals meeting the associated power condition. In a preferred embodiment, for example, a system is provided that segments an available communications bandwidth into a number of different frequency sub-bands that each support multiple CDMA channels. A power range is then specified for each of the sub-bands. When a connection is subsequently established in the system, the system determines a power level associated with the connection and then assigns a channel to the connection within a sub-band having a power range that encompasses the power level. Thus, each sub-band carries communications having similar power levels and communications capacity within each sub-band (and thus within the entire available bandwidth) is nearly optimal. The inventive principles can be advantageously applied in systems implementing any of a number of different multiple access schemes.

The principles of the present invention can provide many significant advantages in a communication system. For example, as discussed above, the principles can be used in a CDMA system to obtain an enhanced level of power efficiency with relatively little reduction in system capacity. Another advantage that can be realized using the inventive principles relates to a reduction in dynamic range that is required. In a communication platform that serves multiple remote coverage regions, the sidelobe requirements of an antenna on the platform typically depend upon an anticipated dynamic range of the system. Thus, the greater the anticipated dynamic range, the lower the antenna sidelobe levels that will be tolerated in the system. By segmenting power levels in the system and thus lowering the effective dynamic range, antenna sidelobe requirements are lightened, thus allowing simpler and less expensive antennas to be designed and implemented. Alternatively, or in addition, the reduced dynamic range can be used to enhance system capacity by allowing closer spacing of redundant frequency cells (i.e., frequency reuse) in the system. Furthermore, the inventive principles will allow a spectrum licensing body to specify different power flux densities within different portions of a band of interest based on the needs of the licensee.

Figure 1:
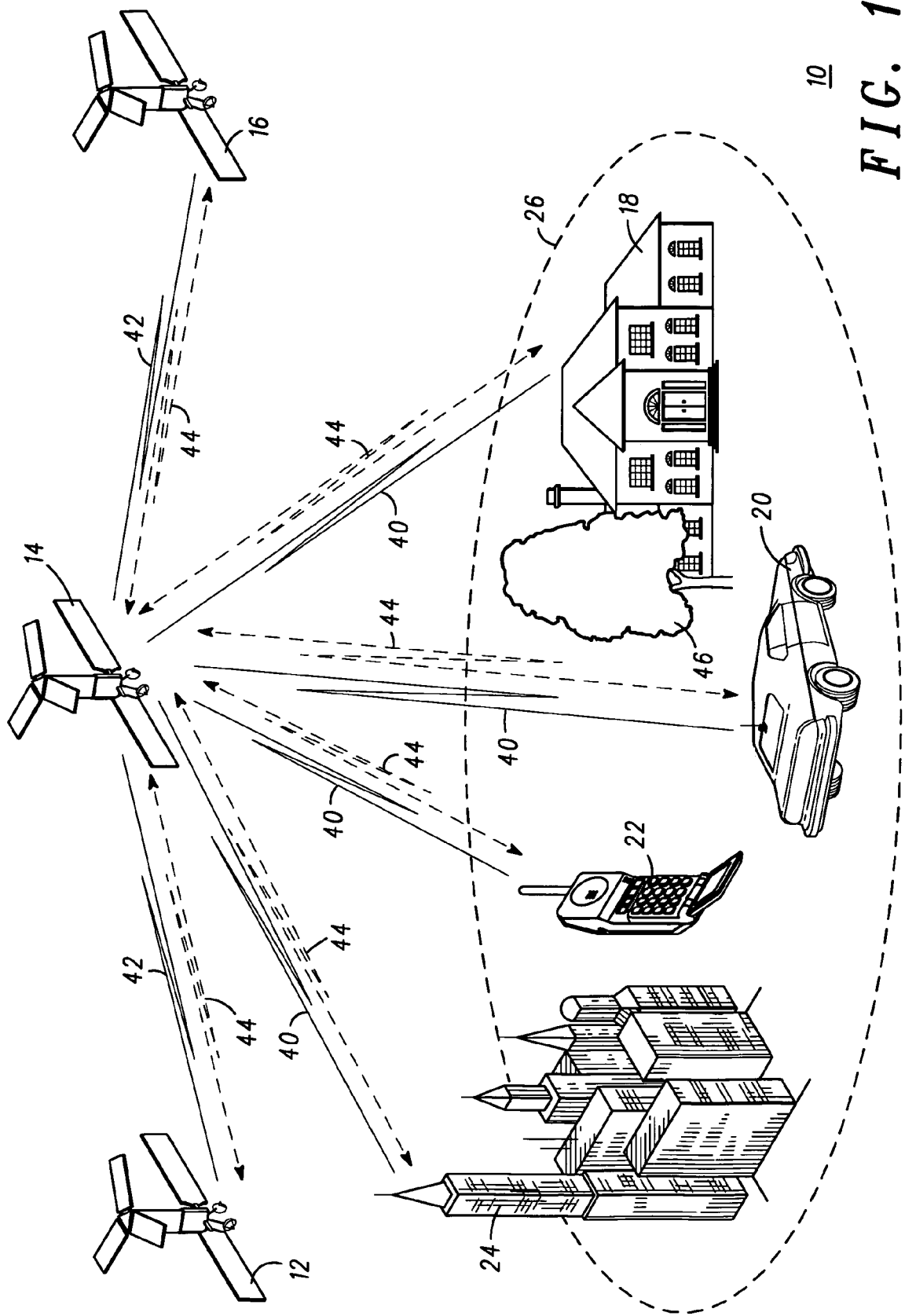
FIG. 1 is a diagram illustrating a satellite communication system that can utilize the principles of the present invention.

FIG. 1 is a diagram illustrating a satellite communications system 10 that can utilize the principles of the present invention. As shown, the system 10 includes a plurality of communications satellites 12, 14, 16 and a plurality of terrestrial subscribers 18, 20, 22, 24. The communication satellites 12, 14, 16 are preferably part of a larger constellation of satellites that orbit the earth within fixed orbital planes. For example, the satellites 12, 14, 16 may be part of a satellite communication system that is capable of providing global communications coverage, such as the Iridium® satellite communication system developed by Motorola. Each of the communication satellites 12, 14, 16 acts as a platform for providing communications services to a plurality of remote entities. For example, satellite 14 can communicate with each of the terrestrial subscribers 18, 20, 22, 24 located within a footprint 26 of an antenna beam generated by an antenna on the satellite 14. In addition to the footprint 26, the satellite 14 may have a number of other footprints (not shown) resulting from other antenna beams generated by the same antenna or other antennas on the satellite 14. In a typical practice, the antenna footprints produced by the satellite 14 will abut one another on the earth's surface to form a single continuous coverage region.

Each of the terrestrial subscribers 18, 20, 22, 24 within the footprint 26 includes a transceiver (i.e., a subscriber unit) for use in communicating with the satellite 14. Similarly, the communication satellite 14 includes a multi-channel transceiver for communicating with the terrestrial subscribers 18, 20, 22, 24. Thus, each subscriber 18, 20, 22, 24 can establish a respective two-way communication link 40 with the satellite 14. The number of different subscribers within the footprint 26 that can be simultaneously serviced by the satellite 14 depends upon a number of factors including the number of channels that are supported by the corresponding multi-channel transceiver on the satellite 14.

Typically, the two-way link 40 between the satellite 14 and a particular terrestrial subscriber will include a separate uplink channel and downlink channel, each within a different frequency range. Therefore, the transmit functionality associated with each terrestrial subscriber will normally be tuned to a different center frequency than the corresponding receive functionality. Using a corresponding subscriber unit, one of the terrestrial subscribers within the footprint 26 (e.g., the driver of automobile 20) can establish a communication connection with another of the subscribers within the same footprint 26 (e.g., an occupant of residence 18) through the satellite 14. Similarly, if the satellite 14 generates other antenna beams, a subscriber within footprint 26 can establish a communication connection with a subscriber within a footprint associated with one of the other antenna beams through the satellite 14.

In addition to the two-way links 40 with the terrestrial subscribers 18, 20, 22, 24, the satellite 14 will also maintain a plurality of cross-links 42 with other satellites (e.g., communications satellites 12 and 16) in the system 10. Thus, subscribers within the footprint 26 can communicate with distant subscribers by utilizing one or more of the cross-links 42 to form the connection. Furthermore, the system 10 also maintains a plurality of signaling channels 44 for use in providing control, management, and synchronization functions within the system 10.

In general, only a limited amount of bandwidth will be available for providing communications between the satellite 14 and the terrestrial subscribers 18, 20, 22, 24 within the footprint 26. Thus, to effectively service a desired number of subscribers, some form of multiple access scheme needs to be implemented so that the subscribers can share the available bandwidth. In a preferred embodiment of the invention, code division multiple access (CDMA) is used to allow multiple terrestrial subscribers to share the available bandwidth. In a typical CDMA system, each of the communications channels sharing a given amount of bandwidth occupy the entire bandwidth so that all of the channels overlap in frequency. The signals being transferred within each of the channels are modulated with a unique code that is uncorrelated to the codes used in the other channels to allow for eventual separation of the signals in a receiver. To separate out a signal corresponding to a particular channel, a received signal is correlated with the code that is known to be associated with the channel. Because the other codes are uncorrelated, the correlation operation allows the desired signal to be extracted from the other signals occupying the same bandwidth.

In a CDMA-based system, the other channels sharing a particular band with a channel-of-interest appear as noise when the correlation operation is being performed for the channel-of-interest. Thus, the larger the power levels of the other channels, the more difficult the correlation operation. If the composite power level of the other channels is too high, for example, the signal to noise ratio (SNR) in the channel-of-interest will be correspondingly low, thus preventing accurate extraction of the desired signals. A maximum communications capacity is thus achieved when the receive power levels of all of the CDMA channels sharing a band are substantially equal, so that the level of noise seen by all of the channels is the same. Preferably, the noise level will be one that ensures reliable signal extraction in all of the channels. If the power level of one of the channels is then raised above the level of the other channels, the SNR in the other channels will decrease to a point where they can no longer properly extract their corresponding signals unless one or more of the channels is discontinued (thus bringing the total noise down to a workable level). Thus, an inequality in power between channels will generally result in less channels sharing the available bandwidth which translates into lowered system capacity.

As is well known in the communications industry, power is a scarce resource on a communications satellite and power conservation is thus a major goal. Therefore, it is desirable that a satellite (e.g., satellite 14 in FIG. 1) only transmit an amount of power to a particular terrestrial subscriber that is necessary to maintain reliable communications with the subscriber. Any more power would be a waste of a valuable resource. As illustrated in FIG. 1, the terrestrial subscribers 18, 20, 22, 24 that are communicating with the satellite 14 from within the footprint 26 can involve significantly different levels of propagation attenuation (i.e., shadowing). For example, in the illustrated embodiment, a subscriber 18 within a residence, a subscriber 20 within an automobile, a pedestrian subscriber 22, and a subscriber 24 within an office building are all simultaneously communicating with the satellite 14. As can be appreciated, each of these subscribers involve a different level of shadowing between the subscriber and the satellite 14. The subscriber 24 in the office building, for example, must communicate with the satellite 14 through a plurality of floors and/or walls of the building. The pedestrian subscriber 22 has a clear line of sight to the satellite 14. The subscriber 18 in the residence has the walls and/or roof of the residence and a tree 46 that will each provide some level of attenuation to communication signals propagating to and from the satellite 14. Therefore, the amount of power that the satellite 14 must transmit to reliably communicate with each of the subscribers varies greatly. Thus, it appears that the dual goals of maximizing capacity and minimizing power consumption cannot be simultaneously achieved.

In conceiving of the present invention, it was determined that by properly segmenting and assigning channels within the available bandwidth, various channel power levels could be accommodated without significantly reducing system capacity. In accordance with a preferred embodiment of the invention, the bandwidth that is available for communication between a communications platform and a plurality of remote entities is first segmented into a plurality of sub-bands. Multiple independent channels are then provided within each sub-band using an appropriate multiple access method (e.g., CDMA). The sub-bands are then each associated with a power range within which the sub-band will operate. When a connection between the platform and one of the entities is being established, a power level associated with the connection is determined. A channel is then assigned to the connection in a sub-band having a power range that includes the power level. By dividing the available bandwidth into sub-bands and selecting a sub-band for a particular connection based on power level, the power levels within any particular sub-band will be relatively homogeneous. Thus, a near optimal system capacity can theoretically be achieved.

Figure 2:
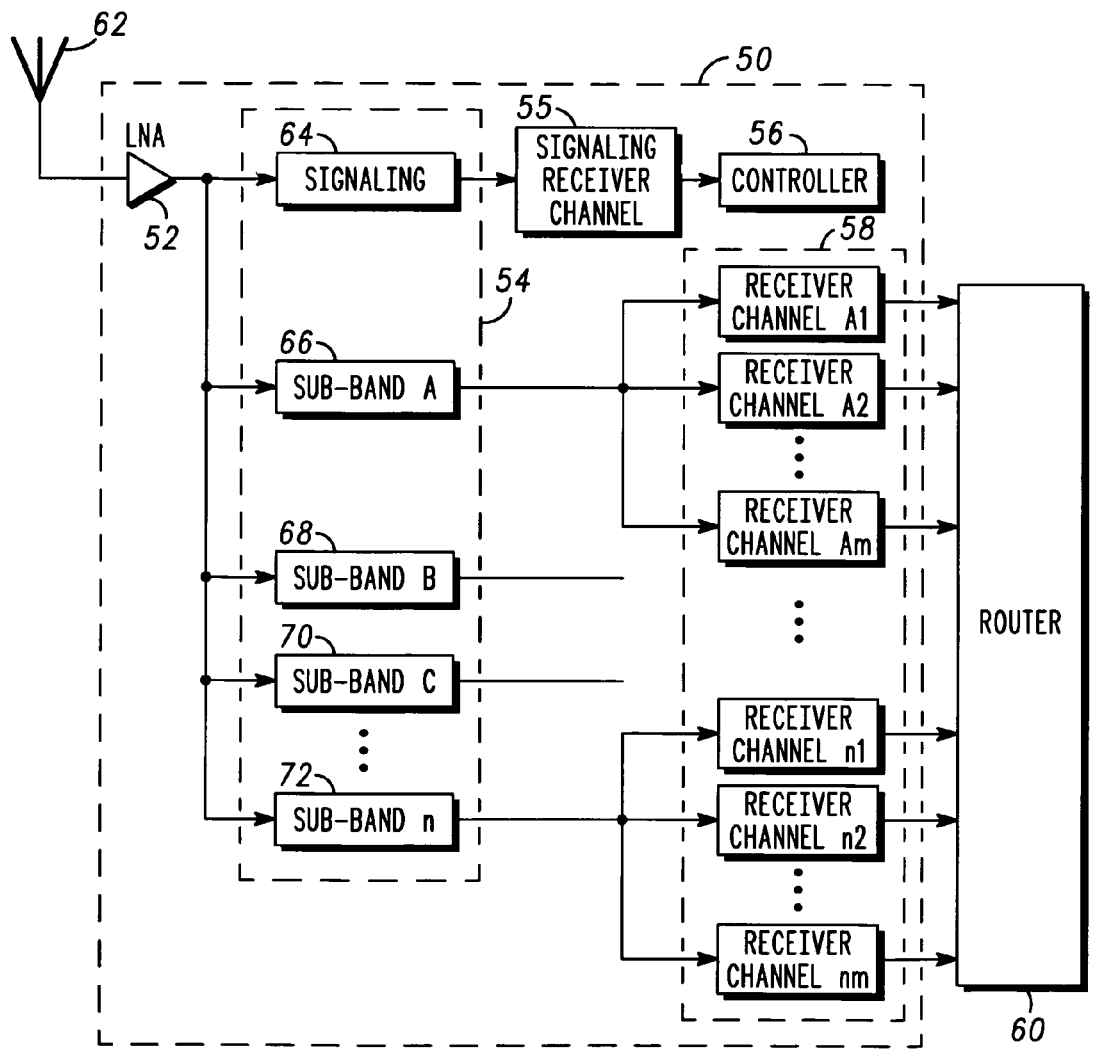
FIG. 2 is a block diagram illustrating a receiver for use on a communications platform in accordance with one embodiment of the present invention.

FIG. 2 is a block diagram illustrating a multi-band, multi-channel receiver 50 in accordance with one embodiment of the present invention. The receiver 50 can be used, for example, within the satellite 14 of FIG. 1 as an uplink receiver for receiving signals from a plurality of terrestrial subscribers. The satellite 14 may include multiple receivers 50 for use with multiple separate antenna receive beams of the satellite 14. The receiver 50 includes: a low noise amplifier (LNA) 52, a filter bank 54, a signaling receive channel 55, a controller 56, and a plurality of receive channels 58. The input of the LNA 52 is coupled to a receive antenna 62 which is capable of simultaneously receiving communication signals from a potentially large number of remote entities. The outputs of the receive channels 58 are coupled to a router 60 for appropriately routing communication signals received, separated, and processed within the receiver 50.

The LNA 52 receives the composite receive signal from the receive antenna 62 and amplifies it to an acceptable level for further processing. The amplified receive signal is then distributed to a plurality of band-pass filter units within the filter bank 54. The filter bank 54 includes a signaling filter 64 for separating a signaling channel from the other signals in the composite receive signal. This signaling channel is used to deliver, among other things, control and management instructions among the various components of the system. The signaling receive channel 55 receives the output signal of the signaling filter 64 and converts the signal to a digital baseband representation that can be recognized by the controller 56. The controller 56 then utilizes the signaling information to perform corresponding system operations. In an alternative approach, the signaling channel may utilize a separate antenna from receive antenna 62.

The filter bank 54 also includes a plurality of sub-band filters 66, 68, 70, 72 that are operative for separating the composite receive signal into a plurality of communication sub-bands. In one embodiment of the invention, each of the sub-bands has a bandwidth of 1.25 megahertz (MHz). The sub-bands each include multiple independent channels for carrying communications signals in the system. In a preferred embodiment, CDMA techniques are used to provide multiple simultaneous channels within each sub-band. As shown in FIG. 2, the output of each of the sub-band filters is delivered to a corresponding bank of receive channels within the plurality of receive channels 58. For example, the output of the sub-band A filter 66 is delivered to receive channels A1, A2, . . . , Am. Each of the plurality of receive channels 58 includes functionality for separating out a corresponding communication signal and for processing the separated signal to a baseband representation. Thus, in a CDMA system, each receive channel will include the appropriate correlation functionality for correlating the communication signal with the corresponding code of the channel. In addition, each of the receive channels will also include functionality typically found within receivers, such as, for example, decoding and down-conversion equipment.

The baseband signals generated by each of the receive channels 58 are delivered to the router 60 which directs the baseband signals to an appropriate destination. For example, in a satellite application, the router 60 may direct a baseband signal output by receive channel A1 to a corresponding downlink transmitter within the same satellite for delivery to a terrestrial subscriber within the same footprint or another footprint of the satellite. Alternatively, the router 60 may direct the baseband signal to a cross-link transceiver within the satellite for delivery to a distant communication entity via multiple intervening satellites. The router 60 is normally configured by the controller 56 during call setup operations.

In accordance with the invention, a power range is specified for each of the sub-bands handled by the receiver 50 that describes a range of receive powers that will be processed within the sub-band. In a preferred approach, the power ranges specified for all of the sub-bands will cover all of the possible subscriber power conditions anticipated by the system. Thus, one or more of the sub-bands will operate with highly shadowed subscribers that will generate relatively low power receive signals in the receiver 50. One or more other sub-bands will operate with lightly shadowed subscribers that generate relatively high power receive signals in the receiver 50. Still other sub-bands can operate with subscribers generating one or more intermediate power levels in the receiver 50. The number of sub-bands created within the available bandwidth will generally limit the number of different power ranges that can be defined. In general, the larger the number of individual power ranges defined, the greater the degree of power level parity within each sub-band. Each of the sub-bands can have a different power range from the other sub-bands or one or more sub-band groups can be developed where all of the sub-bands in the group have a common power range. In addition, the individual power ranges may overlap one another so that a signal having a particular power level might fall within multiple different power ranges.

During a typical call setup operation, a remote subscriber delivers a channel request signal to the receiver 50 at full power via the signaling channel. The channel request signal is received by the antenna 62, amplified in the LNA 52, filtered in the signaling filter 64, converted to a baseband representation in the signaling receive channel 55, and delivered to the controller 56. The controller 56 then measures a power level associated with the channel request signal. Based on the power measurement, the controller 56 assigns a channel in the receiver 50 to the connection. The controller 50 first determines which of the sub-bands are appropriate for use with the measured power level. If the measured power level falls into the power range of only one of the sub-bands, the controller 50 selects a free channel within that sub-band to service the connection. The controller 56 then sends an acknowledgment signal to the requesting subscriber, via the signaling channel, specifying the sub-band and code to use for transmissions to the receiver 50 during the connection. The requesting subscriber then configures associated transmit functionality based on the received information. The controller 56 also instructs the router 60 to set up a connection between the selected channel and other functionality within the platform.

If the measured power level of the channel request signal falls into multiple sub-band power ranges, then an additional step must be performed to decide which of the sub-bands will handle the connection. A set of decision rules will normally be established for performing this function. For example, if multiple sub-bands having identical power ranges are indicated, the sub-band that is currently handling the least traffic may be chosen. Alternatively, a sub-band that is currently handling connections having power levels closer to the measured power level may be chosen. For example, one of the sub-bands can be used for connections having power levels high in the power range and another for connections having power levels low in the power range. This technique produces even further tightening of power levels within each particular sub-band. In another approach, a priority scheme is used to select one of the sub-bands. If multiple sub-bands having different but overlapping power ranges are indicated, similar decisions can be made based upon current traffic levels, power levels, and/or priorities. Other selection criteria are also possible.

Once a channel has been assigned by the controller 56, that channel can service the requesting subscriber for the entire duration of the connection. Alternatively, the controller 56 can periodically or continuously monitor power levels in the receive channels to determine whether changes have occurred that require a channel assignment modification. As can be appreciated, the shadowing scenario of a subscriber can change dramatically over the course of a single connection. For example, a pedestrian can move from a highly shadowed position inside a building to a minimally shadowed position outside the building. Similarly, an automobile may move from a city street lined with tall buildings to an open highway having little obstruction. In addition, shadowing conditions can change based solely on the movement of the platform (e.g., a satellite) with respect to the subscribers. In one embodiment, therefore, the controller 56 monitors the power level of the extracted communication signals in the receive channels to determine whether the levels have changed enough to warrant a channel reassignment. If a channel reassignment is deemed proper, the controller 56 selects a new sub-band and channel for the connection and delivers the appropriate information to the subscriber via the signaling channel. The controller 56 will also cause the router 60 to be reconfigured based on the change. In some cases, rather than implementing a channel change, the controller 56 will instruct the subscriber's transceiver unit to modify its transmit power level so that it is in accord with a present channel assignment. When possible, this technique offers a simpler way to maintain power level parity within the sub-bands.

Figure 3:
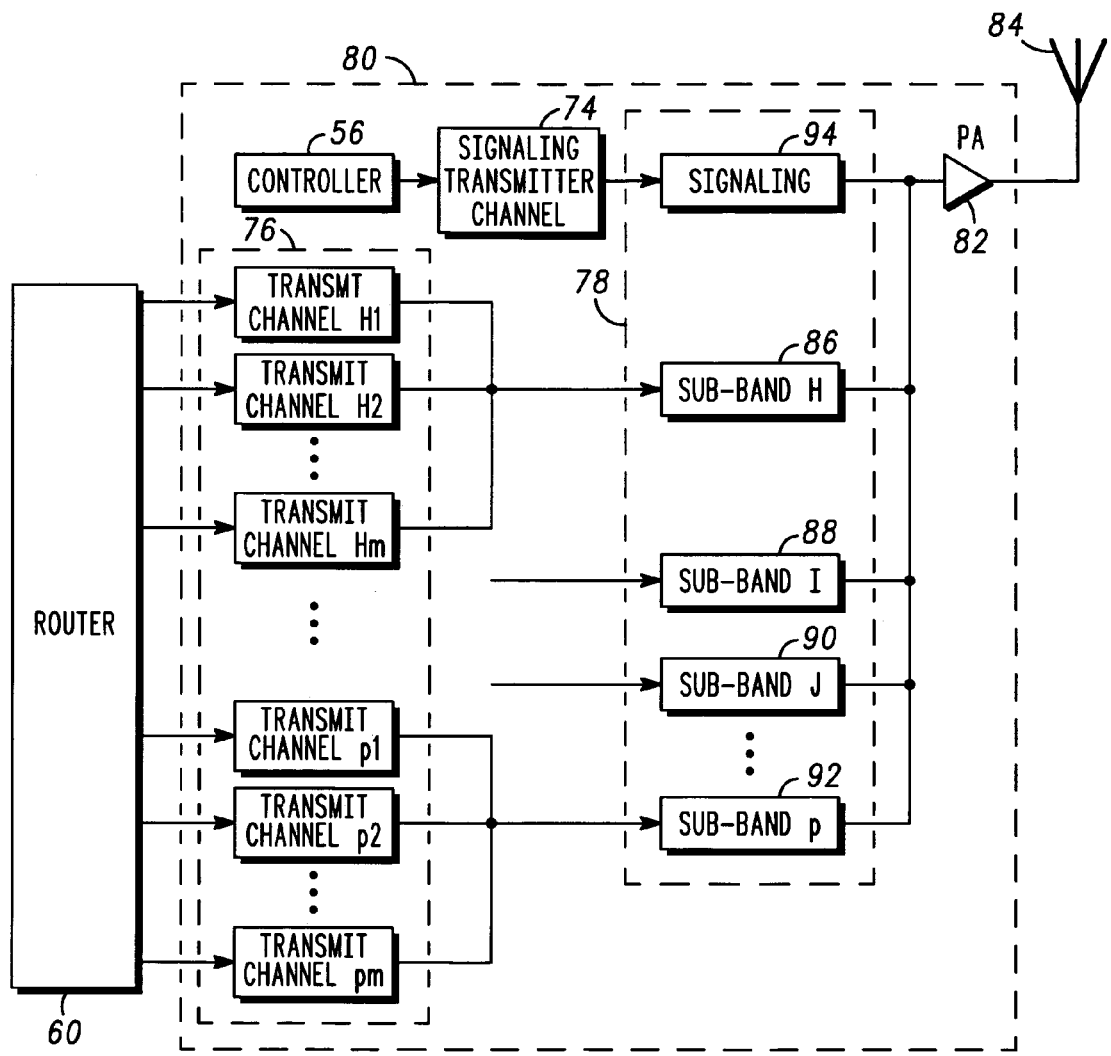
FIG. 3 is a block diagram illustrating a transmitter for use on a communications platform in accordance with one embodiment of the present invention.

FIG. 3 is a block diagram illustrating a multi-band, multi-channel transmitter 80 in accordance with one embodiment of the present invention. The transmitter 80 can be used, for example, within the satellite 14 of FIG. 1 as a downlink transmitter for transmitting signals to the plurality of terrestrial subscribers 18, 20, 22, 24 within the footprint 26. As such, additional transmitters 80 may also be provided for use with other antenna transmit beams of the satellite 14. For convenience, the same reference numerals are used in FIG. 3 that were used in previous figures to describe the same or similar functionality. The transmitter 80 includes: a controller 56, a signaling transmit channel 74, a plurality of transmit channels 76, a filter bank 78, and a power amplifier 82. The output of the power amplifier 82 is coupled to a transmit antenna 84 that is capable of simultaneously transmitting signals to a potentially large number of remote subscribers. The inputs of the plurality of transmit channels 76 are coupled to a router 60 that delivers communication signals to the individual channels for transmission to the remote subscribers.

Each of the plurality of transmit channels 76 is operative for generating a transmit signal within a corresponding sub-band and in accordance with a corresponding multiple access scheme. As described above, in a preferred embodiment, CDMA is used as the multiple access scheme within each of the sub-bands. Thus, each of the transmit channels 76 will preferably include modulation functionality for modulating a corresponding communication signal with an appropriate code. In addition, each of the transmit channels 76 also include other transmit functionality typically found within a transmitter, such as encoding and frequency up-conversion equipment.

The transmit signals generated by the transmit channels within a particular sub-band are combined into a composite sub-band signal which is delivered to a corresponding sub-band filter in the filter bank 78. Although not illustrated, a separate combiner structure may be provided for combining the transmit signals within a sub-band. The sub-band filter processes the composite sub-band signal to remove any spurious out of band energy from the signal. The composite sub-band signals from all of the sub-band filters are then combined into a single composite signal which is delivered to the power amplifier 82 for amplification. Again, a separate combiner structure may be provided for combining the composite sub-band signals. The power amplifier 82 amplifies the composite signal to an appropriate level for transmission and delivers the amplified signal to the transmit antenna 84 which radiates the signal for delivery to the remote subscribers.

The bank of sub-band filters 78 also includes a signaling filter 94 for use in transmitting, for example, control and management instructions on a signaling channel, as discussed previously. The controller 56 will deliver signaling information to the signaling transmit channel 74 which uses the information to generate a signaling transmit signal for delivery to the subscribers. The signaling transmit signal is filtered by the signaling filter 94 and then combined and amplified with the other transmit signals before being radiated from the transmit antenna 84. In an alternative embodiment, a separate signaling antenna is provided for radiating the signaling transmit signal.

During a typical call setup procedure, the controller 56 will transmit a connection request signal to a predetermined subscriber transceiver unit via the signaling channel. If the subscriber is willing to accept the call, the subscriber transceiver unit will acknowledge acceptance by delivering an acknowledgment signal back to the controller 56 via the signaling channel. In the acknowledgment signal, the subscriber transceiver unit can indicate whether the request signal was of an appropriate power level. For example, if the power level of the request signal was greater than needed, the transceiver unit can indicate same and the controller 56 can adjust the transmit power level of the transmitter 80 accordingly. If the power level was too low, a similar adjustment can be made. In some cases, the power level of the originally transmitted request signal will be so low that it is not detected by the intended subscriber unit and, therefore, no acknowledgment signal can be returned. In such a case, the controller 56 will transmit a second request signal at a higher power level. This procedure will then be repeated until either an acknowledgment signal is received or a maximum transmit power has been reached. Eventually, if the subscriber is available, an appropriate power level for transmission to the subscriber will be determined. Other methods for determining an appropriate transmit power level may also be used in accordance with the present invention.

In a manner similar to that discussed previously with respect to the receiver 50 of FIG. 2, a power range is specified for each of the sub-bands of the transmitter 80 of FIG. 3. The power range denotes a range of individual channel transmit powers that will be handled by the sub-band. Thus, after an appropriate transmit power level has been determined for a particular connection, the connection is assigned to a channel within a corresponding sub-band. Sub-band selection will be similar to that discussed earlier in connection with the receiver 50. After a sub-band and channel have been selected, the controller 56 delivers the corresponding frequency and code information to the subscriber for use in configuring associated receive functionality. As discussed previously, the controller 56 can monitor the active connections to determine whether appropriate transmit power levels are being used. If not, transmit power level modifications and corresponding channel changes can be implemented.

In one embodiment of the invention, the receiver 50 of FIG. 2 and the transmitter 80 of FIG. 3 are both part of a common communications platform (e.g., satellite 14 of FIG. 1) and both service a common footprint area. Thus, when the receiver 50 receives a channel request, the controller 56 can use the subsequent acknowledgment signal transmitted to the requesting subscriber to determine an appropriate transmit power level for the connection. Thus, in a satellite application, both an uplink and a downlink channel can be selected for the requesting subscriber at substantially the same time. Similarly, when the transmitter 80 delivers a connection request signal to a remote subscriber requesting a connection with the subscriber, the controller 56 can use the acknowledgment signal from the subscriber to determine a receive sub-band and channel for the subscriber. In this manner, optimal two way communication is established with each subscriber regardless of the origin of the connection request.

Figure 4:
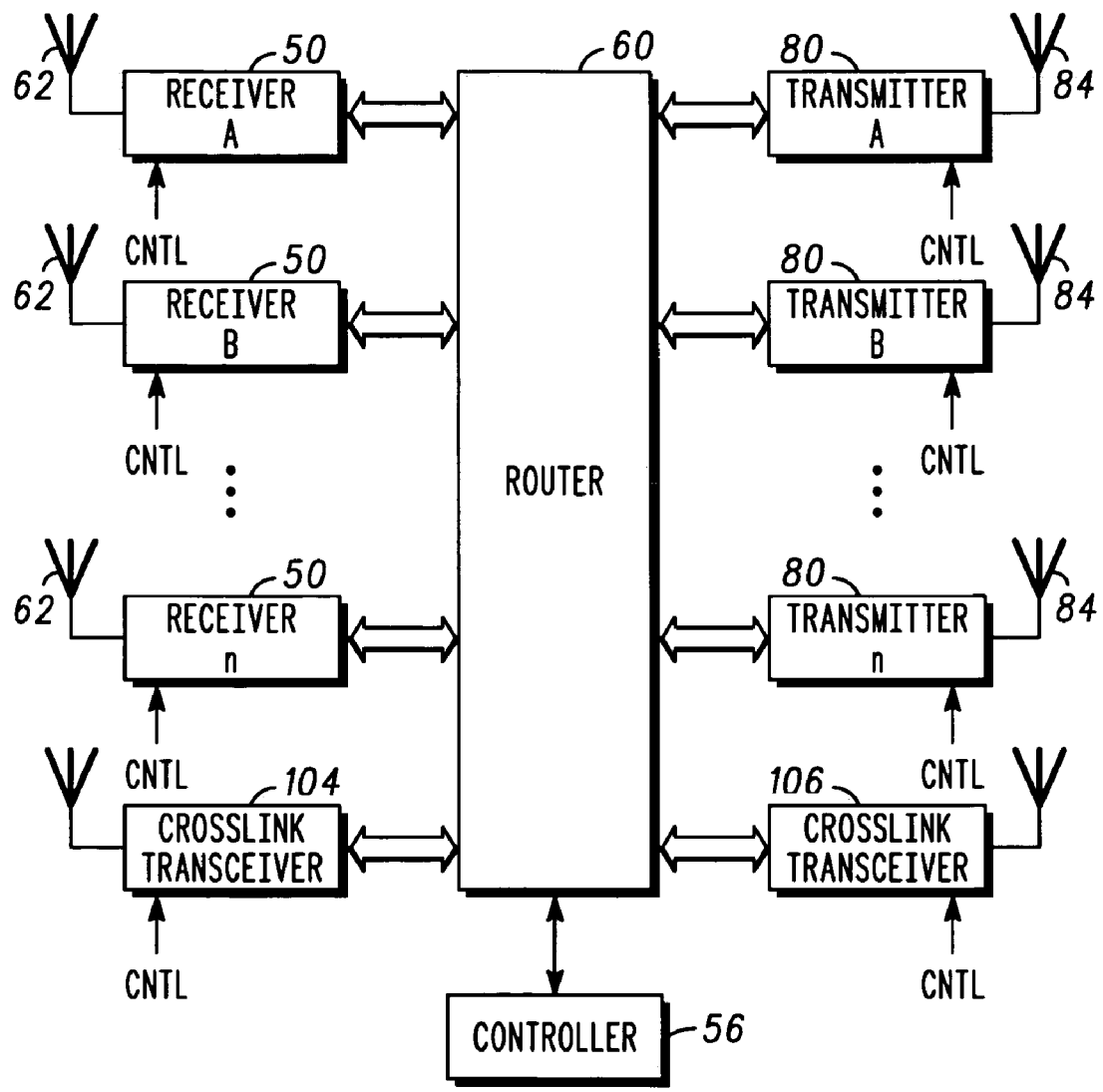
FIG. 4 is a block diagram illustrating a satellite transceiver arrangement in accordance with one embodiment of the present invention.

In addition, the common communication platform may include other receivers 50 and other transmitters 80 for servicing other footprint areas. For example, FIG. 4 illustrates a possible transceiver arrangement 100 for use within a satellite communications platform. As illustrated, a single router 60 is coupled to a number of receiver units 50 (i.e., receiver A, B, . . . , n) and a number of transmitter units 80 (i.e., transmitter A, B, . . . , n). Each receiver unit 50 (e.g., receiver A) has a corresponding transmitter unit 80 (e.g., transmitter A) that operates within the same footprint of the satellite. The router 60 is also coupled to two cross-link transceivers 104, 106 that communicate with other satellites in the system. A single controller 56 is used to control all of the elements in the transceiver arrangement 100. Thus, connections can be made within individual footprints, between different footprints of the same satellite, or between different footprints in different satellites.

In one embodiment of the invention, the power ranges of the sub-bands are dynamically adjusted during system operation. For example, it may be found that a greater number of highly shadowed connections occur during the day, while more lightly shadowed connections occur at night. Therefore, a greater number of high power sub-bands can be specified at night than are specified during the day. A similar approach can be taken on weekends and holidays. In addition, profiles can be maintained for a particular time period to detect changing trends within the time period that may require an adjustment in the sub-band power range assignments.

Figure 5:
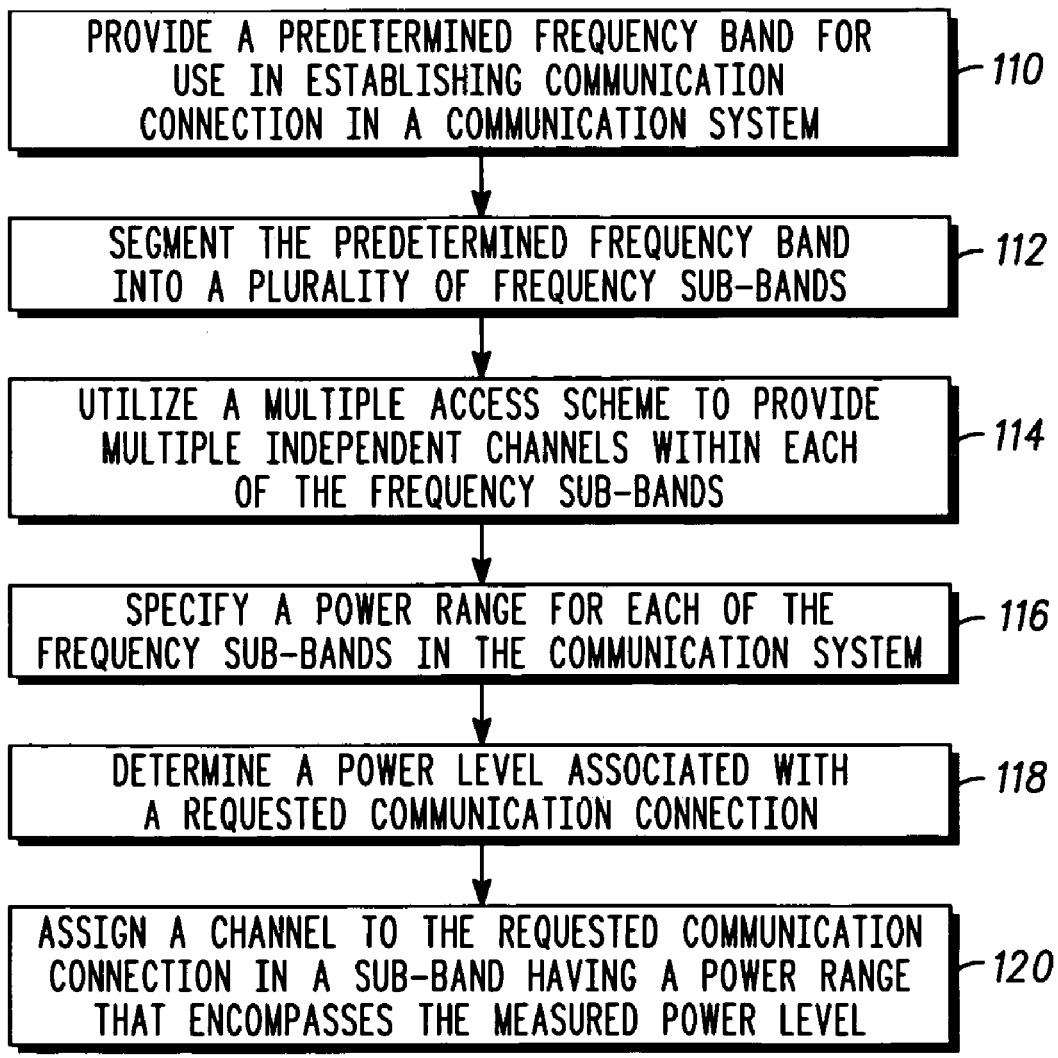
FIG. 5 is a flowchart illustrating a method for managing the operation of a communications platform in accordance with one embodiment of the present invention.

FIG. 5 is a flowchart illustrating a method for managing the operation of a communications platform in a communications system in accordance with one embodiment of the present invention. A predetermined frequency band is provided for use in establishing communication connections in the communication system (step 110). The predetermined frequency band is then segmented into a plurality of frequency sub-bands (step 112). A multiple access scheme is then implemented within each of the sub-bands to provide multiple independent communication channels therein (step 114). A power range is then specified for each of the frequency sub-bands (step 116). When a new connection is to be established, a power level associated with the connection is determined (step 118). A channel is then assigned to the new connection in a sub-band having a power range that encompasses the determined power level (step 120).

Figure 6:
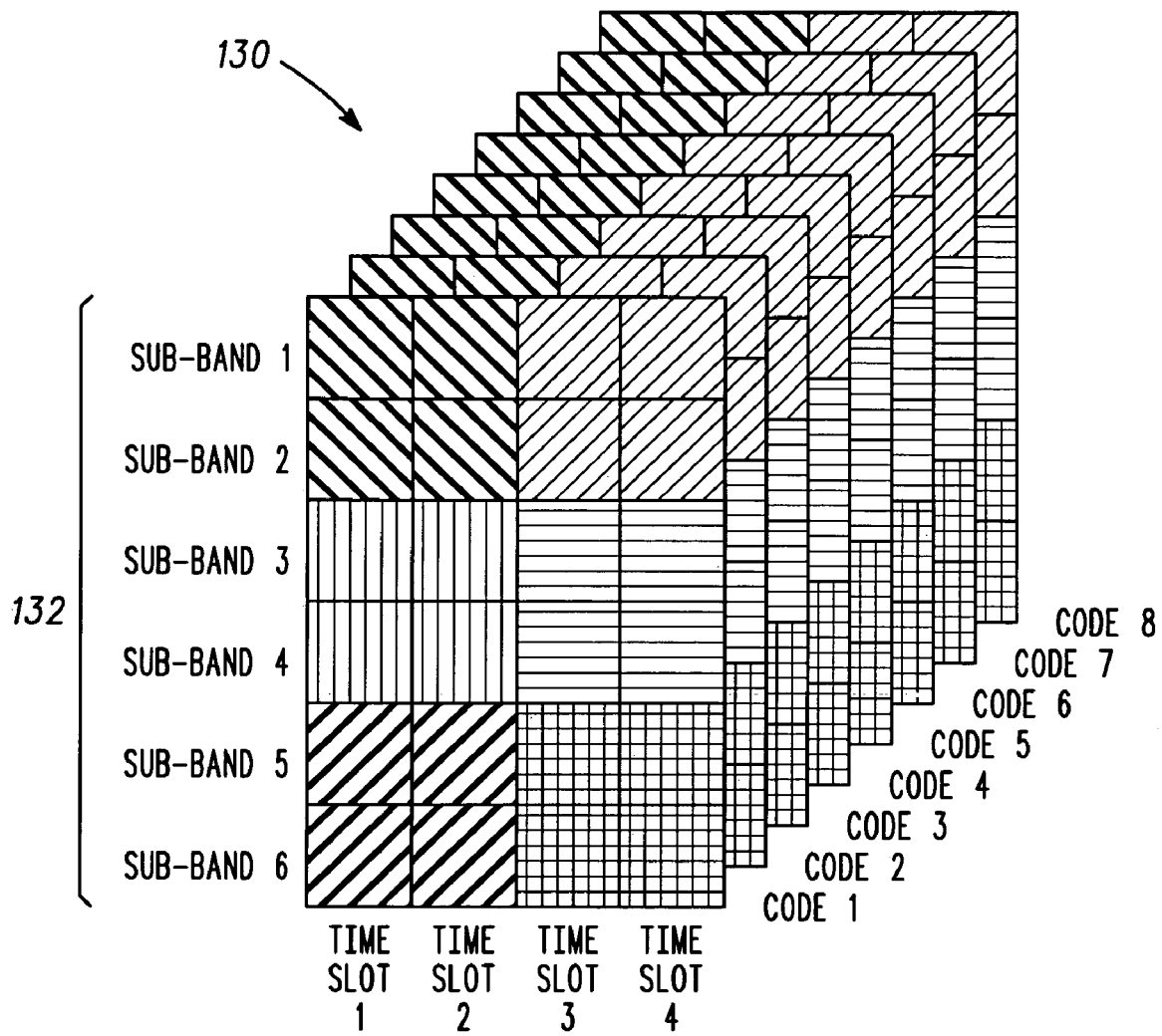
FIG. 6 is a channel diagram illustrating a channel arrangement in accordance with one embodiment of the present invention.

FIG. 6 is a channel diagram illustrating another channel arrangement 130 that can advantageously implement the principles of the present invention. As illustrated, the channel arrangement 130 utilizes a frequency division multiple access (FDMA)/time division multiple access (TDMA)/code division multiple access (CDMA) approach to provide multiple independent channels within an available bandwidth. An available bandwidth 132 is segmented into a number of sub-bands (i.e., sub-band 1 to sub-band 6) which are each divided in time into a number of time slots (i.e., time slot 1 to time slot 4). Each time-slot in a particular sub-band is then divided into a number of independent CDMA channels, each utilizing a unique code (i.e., code 1 to code 8). Thus, in the channel diagram of FIG. 6, each of the small squares (e.g., there are 24 small squares corresponding to each code in the illustrated embodiment) represents an independent communication channel. The actual number of sub-bands, time slots, and codes used in a particular implementation is a matter of design choice.

In accordance with the invention, as illustrated in FIG. 6, the channels in the channel arrangement 130 are divided into a number of channel groups (each indicated with different shading) that each correspond to a different power range. Thus, when a connection is being established in a system using channel arrangement 130, a power level associated with the connection is first determined and then a channel is assigned to the connection within a channel group having a power range that encompasses the power level. The channel groups can each encompass one or more entire sub-bands or, as illustrated in FIG. 6, the individual channel groups can include portions of a sub-band (i.e., less than all of the time slots within a sub-band). Preferably, each channel group will cover all of the codes that will occur within each time-slot of a sub-band. In another embodiment of the invention, the entire available bandwidth 132 is divided into time slots with no frequency segmenting. The individual time slots (or groups of them) are then each assigned a power range in accordance with the invention. As will be appreciated by a person of ordinary skill in the art, other channel arrangements can also be used.

The principles of the present invention can be used with virtually any form of communications platform including, for example, satellite based, terrestrial based, airborne, or ship borne platforms. In addition, the platforms can be either stationary or mobile. Furthermore, the inventive principles can be advantageously employed regardless of the number or type of communication entities vying for use of the available spectral resources. In addition, the inventive principles can be used with multiple access schemes other than CDMA. For example, in the embodiment illustrated in FIG. 2, each of the sub-bands could be divided into predetermined time slots in a time division multiple access (TDMA) arrangement rather then a CDMA arrangement.

Although the present invention has been described in conjunction with its preferred embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method for managing channel assignment in a wireless communication system having a plurality of cells, each cell having a predetermined frequency band for use in establishing communication connections, said method comprising the steps of:
    dividing the predetermined frequency band into a plurality of frequency sub-bands within at least one of the plurality of cells;
    implementing a multiple access scheme within each of said plurality of frequency sub-bands;
    specifying a power range for each of said plurality of frequency sub-bands, said power range representing a range of signal powers that are to be supported by one of a plurality of channels within each of said plurality of frequency sub-bands, wherein at least two of said plurality of frequency sub-bands are assigned power ranges that are different from one another;
    upon receipt of a first communication connection in the wireless communication system, ascertaining a receive power level associated with a receive side of the first communication and a transmit power level associated with a transmit side of the first communication;
    identifying at least one of said plurality of frequency sub-bands within the at least one cell that has a power range encompassing said receive power level;
    assigning a channel within said at least one of said plurality of frequency sub-bands that has said power range encompassing said receive power level to said receive side of said first communication connection;
    identifying at least one of said plurality of frequency sub-bands within the at least one cell that has a power range encompassing said transmit power level; and
    assigning a channel within said at least one of said plurality of frequency sub-bands that has said power range encompassing said transmit power level to said transmit side of said first communication connection.

2. The method claimed in claim 1, wherein:
    said plurality of frequency sub-bands includes a first frequency sub-band having a plurality of code division multiple access (CDMA) channels.

3. The method claimed in claim 1, wherein:
    said plurality of frequency sub-bands includes a first frequency sub-band having a plurality of time division multiple access (TDMA) channels.

4. The method claimed in claim 1, wherein said first communication connection is a communication connection with a remote entity, and wherein:
    said step of ascertaining a receive power level and a transmit power level includes measuring a power level of a received connection request signal received from said remote entity via said first communication connection to determine a receive power level.

5. The method claimed in claim 1, wherein said first communication connection is a communication connection with a remote entity, and wherein:
    said step of ascertaining a receive power level and a transmit power level includes determining a transmit power level required to communicate with said remote entity in response to a connection request acknowledge signal received from said remote entity via said first communication connection.

6. The method claimed in claim 5, wherein said step of determining a transmit power level comprises the steps of:
    receiving said connection request acknowledge signal from said remote entity in response to said remote entity receiving a connection request signal, said connection request acknowledge signal including a transmit power indication indicating a power level of said connection request signal as measured at said remote entity;
    determining a transmit power level required to communicate with said remote entity in response to said transmit power indication.

7. The method claimed in claim 5, wherein said step of determining a transmit power level comprises the steps of:
    transmitting a connection request signal to said remote entity at a predetermined transmit power level;
    determining whether a connection request acknowledge signal has been received from said remote entity;
    in response to a connection request acknowledge signal not being received from said remote entity, transmitting the connection request signal to said remote entity at an increased transmit power level.

8. The method claimed in claim 7, wherein said step of transmitting the connection request signal at an increased transmit power level comprises the steps of:
    increasing the transmit power level a predetermined power from a previous transmit power level to the increased transmit power level, wherein a previous connection request signal was transmitted to said remote entity at said previous transmit power;
    transmitting a connection request signal to said remote entity at the increased transmit power level; and
    repeating the increasing and transmitting steps wherein the increased transmit power level for the previous transmitting step becomes the previous transmit power level for the increasing step, the increasing and transmitting steps repeated until a connection request acknowledge signal is received from said remote entity or the previous transmit power level is equivalent to a maximum transmit power level.

9. The method claimed in claim 1, wherein:
    said wireless communication system includes a satellite communication system, wherein said predetermined frequency bandwidth represents a bandwidth available for communication between a satellite and a plurality of terrestrial users.

10. The method claimed in claim 1, wherein said first communication connection is a communication connection with a remote entity, and wherein said step of ascertaining a receive power level and a transmit power level includes the steps of:
- receiving a connection request acknowledge signal from said remote entity in response to said remote entity receiving a connection request signal, said connection request acknowledge signal including a transmit power indication indicating a power level of said connection request signal as measured at said remote entity;
- determining a receive power level required to communicate with said remote entity by measuring a power level of said connection request acknowledge signal; and
- determining a transmit power level required to communicate with said remote entity in response to said transmit power indication.

11. The method claimed in claim 1, wherein said at least one of said plurality of frequency sub-bands having a power range encompassing said receive power level comprises more than one of said plurality of frequency sub-bands and wherein:
- said step of assigning a channel to said receive side of said first communication connection includes assigning a channel within said more than one of said plurality of frequency sub-bands to said receive side of said first communication connection in response to a number of active communication connections on each of said more than one of said plurality of frequency sub-bands.

12. The method claimed in claim 1, wherein said at least one of said plurality of frequency sub-bands having a power range encompassing said receive power level comprises more than one of said plurality of frequency sub-bands and wherein:
- said step of assigning a channel to said receive side of said first communication connection includes assigning a charnel within said more than one of said plurality of frequency sub-bands to said receive side of said first communication connection in response to a predetermined prioritization of said more than one of said plurality of frequency sub-bands.

13. The method claimed in claim 1, wherein said at least one of said plurality of frequency sub-bands having a power range encompassing said transmit power level comprises more than one of said plurality of frequency sub-bands and wherein:
- said step of assigning a channel to said transmit side of said first communication connection includes assigning a channel within said more than one of said plurality of frequency sub-bands to said transmit side of said first communication connection in response to a number of active communication connections on each of said more than one of said plurality of frequency sub-bands.

14. The method claimed in claim 1, wherein said at least one of said plurality of frequency sub-bands having a power range encompassing said transmit power level comprises more than one of said plurality of frequency sub-bands and wherein:
- said step of assigning a channel to said transmit side of said first communication connection includes assigning a channel within said more than one of said plurality of frequency sub-bands to said transmit side of said first communication connection in response to a predetermined prioritization of said more than one of said plurality of frequency sub-bands.

15. The method claimed in claim 1, further comprising the steps of:
- monitoring said receive power level associated with said receive side of the first communication by measuring said receive power level at predetermined intervals during said first communication connection to determine whether said receive power level has changed; and
- assigning a new channel within said at least one of said plurality of frequency sub-bands that has said power range encompassing said measured receive power level to said receive side of said first communication connection in response to determining that said receive power level has changed.

16. The method claimed in claim 1, wherein said first communication connection is a communication connection with a remote entity, the method further comprising the steps of:
- monitoring said receive power level associated with said receive side of the first communication by measuring said receive power level at predetermined intervals during said first communication connection to determine whether said receive power level has changed; and
- transmitting a transmit power modify signal to said remote entity in response to determining that said receive power level has changed, the transmit power modify signal instructing said remote entity to modify the transmit power thereof.

17. The method claimed in claim 1, wherein:
- said step of specifying a power range for each of said plurality of frequency sub-bands includes respecifying a power range for each of said plurality of frequency sub-bands in response to time.

18. The method claimed in claim 17, wherein:
- said step of respecifying a power range for each of said plurality of frequency sub-bands includes respecifying a power range for each of said plurality of frequency sub-bands in response to whether the time is daytime or nightime.

19. The method claimed in claim 17, wherein:
- said step of respecifying a power range for each of said plurality of frequency sub-bands includes respecifying a power range for each of said plurality of frequency sub-bands in response to whether the time is a weekday, a weekend day or a holiday.

20. A system for providing wireless communication between a communication platform and a plurality of subscribers, said system comprising:
- a predetermined frequency band for providing said wireless communication from a wireless cell, said predetermined frequency band being divided: into a plurality of frequency sub-bands that are each capable of supporting a plurality of communication channels;
- means for specifying a power range for each of said plurality of frequency sub-bands within the wireless cell, said power range representing a range of signal powers that are to be supported by one of a plurality of channels within each of said plurality of frequency sub-bands;
- means for determining a receive power level and a transmit power level associated with a wireless connection between said communication platform and one of the plurality of subscribers;
- means for selecting at least one of said plurality of frequency sub-bands within the wireless cell that has a power range encompassing said receive power level determined by said means for determining;
- means for assigning a channel within said at least one of said plurality of frequency sub-bands within the wireless cell that has said power range encompassing said receive power level determined by said means for determining to a receive side of said wireless connection for use in providing wireless communication between said one of said plurality of subscribers and said communication platform;

means for selecting at least one of said plurality of frequency sub-bands within the wireless cell that has a power range encompassing said transmit power level determined by said means for determining; and means for assigning a channel within said at least one of said plurality of frequency sub-bands within the wireless cell that has said power range encompassing said transmit power level determined by said means for determining to a transmit side of said wireless connection for use in providing wireless communication between said communication platform and said one of said plurality of subscribers.

21. The system claimed in claim 20, wherein:
said plurality of frequency sub-bands includes a first frequency sub-band having a plurality of code division multiple access (CDMA) channels.

22. The system claimed in claim 20, wherein:
said plurality of frequency sub-bands includes a first frequency sub-band having a plurality of time division multiple access (TDMA) channels.

23. The system claimed in claim 20, further comprising:
means for monitoring said wireless connection to determine whether a power condition has changed during said wireless connection; and means for assigning a new channel within a different frequency sub-band to said wireless connection when said means for monitoring determines that said power condition has changed.

24. The system claimed in claim 20, wherein said means for determining a receive power level and a transmit power level comprises:
means for transmitting a connection request signal to said one of the plurality of subscribers at a predetermined transmit power level; and means for determining whether a connection request acknowledge signal has been received from said one of the plurality of subscribers, wherein said means for transmitting a connection request transmits a connection request signal to said one of the plurality of subscribers at an increased transmit power level in response to a connection request acknowledge signal not being received from said one of the plurality of subscribers.

25. The system claimed in claim 24, wherein said means for transmitting a connection request repeatedly increases the transmit power level to an increased transmit power level and transmits a connection request to said one of the plurality of subscribers at the increased transmit power level until a connection request acknowledge signal is received from said one of the plurality of subscribers or the increased transmit power level is equivalent to a maximum transmit power level.

26. The system claimed in claim 20, wherein said at least one of said plurality of frequency sub-bands having a power range encompassing said receive power level comprises more than one of said plurality of frequency sub-bands and wherein:
said means for assigning a channel to said receive side of said wireless connection assigns a channel within said more than one of said plurality of frequency sub-bands to said receive side of said wireless connection in response to a number of active connections on each of said more than one of said plurality of frequency sub-bands.

27. The system claimed in claim 20, wherein said at least one of said plurality of frequency sub-bands having a power range encompassing said receive power level comprises more than one of said plurality of frequency sub-bands and wherein:
said means for assigning a channel to said receive side of said wireless connection assigns a channel within said more than one of said plurality of frequency sub-bands to said receive side of said wireless connection in response to a predetermined prioritization of said more than one of said plurality of frequency sub-bands.

28. The system claimed in claim 20, wherein said at least one of said plurality of frequency sub-bands having a power range encompassing said transmit power level comprises more than one of said plurality of frequency sub-bands and wherein:
said means for assigning a channel to said transmit side of said wireless connection assigns a channel within said more than one of said plurality of frequency sub-bands to said transmit side of said wireless connection in response to a number of active connections on each of said more than one of said plurality of frequency sub-bands.

29. The system claimed in claim 20, wherein said at least one of said plurality of frequency sub-bands having a power range encompassing said transmit power level comprises more than one of said plurality of frequency sub-bands and wherein:
said means for assigning a channel to said transmit side of said wireless connection assigns a channel within said more than one of said plurality of frequency sub-bands to said transmit side of said wireless connection in response to a predetermined prioritization of said more than one of said plurality of frequency sub-bands.

30. The system claimed in claim 20 further comprising:
means for monitoring said receive side of said wireless connection to determine whether a power condition has changed during said wireless connection; and transmitting a transmit power modify signal to said one of the plurality of subscribers in response to determining that said receive power level has changed, the transmit power modify signal instructing said one of the plurality of subscribers to modify the transmit power thereof.

31. The system claimed in claim 20, wherein:
said means for specifying a power range for each of said plurality of frequency sub-bands respecifies a power range for each of said plurality of frequency sub-bands in response to time.

32. The system claimed in claim 31, wherein:
said means for specifying a power range for each of said plurality of frequency sub-bands respecifies a power range for each of said plurality of frequency sub-bands in response to whether the time is daytime or nighttime.

33. The system claimed in claim 31, wherein:
said means for specifying a power range for each of said plurality of frequency sub-bands respecifies a power range for each of said plurality of frequency sub-bands in response to whether the time is a weekday, a weekend day or a holiday.

34. A method for providing multiple access communications between a first location and a second location, said method comprising the steps of:
- providing a predetermined frequency band for a wireless cell for use in establishing communication connections between said first location and said second location;
- segmenting said predetermined frequency band within the wireless cell into a plurality of frequency sub-bands;
- providing a multiple access scheme within each of said plurality of frequency sub-bands;
- specifying a power range for each of said plurality of frequency sub-bands, said power range representing a range of signal powers that are to be supported by one of a plurality of channels within each of said plurality of frequency sub-bands;
- determining power levels of received signals received from remote entities within the wireless cell to establish receive sides of wireless communication connections with said remote entities;
- assigning the received signals to frequency sub-bands having power ranges that encompass the power level of the received signals;
- determining power levels for transmit signals for transmit sides of said wireless communication connections with said remote entities; and
- assigning the transmit signals to frequency sub-bands having power ranges that encompass the power level determined for the transmit signals.

35. The method claimed in claim 34, wherein:
said step of assigning the received signals includes determining said power level associated with a receive side of one of said wireless communication connections and selecting one of said plurality of frequency sub-bands from said plurality of frequency sub-bands for use by said receive side of said one of said wireless communication connections based on said power level.

36. The method claimed in claim 35, wherein:
said step of assigning the received signals includes assigning a CDMA channel within said one of said plurality of frequency sub-bands to said receive side of said one of said wireless communication connections.

37. The method claimed in claim 34, wherein:
said step of segmenting said predetermined frequency band into a plurality of frequency sub-bands includes defining a plurality of receive frequency sub-bands, and wherein
said step of assigning the received signals includes assigning the received signals to receive frequency sub-bands having power ranges that encompass the power level of the received signals.

38. The method claimed in claim 37, wherein:
said step of assigning the received signals to receive frequency sub-bands includes the step of assigning the received signals to receive frequency sub-bands having power ranges that encompass the power level of the received signals in response to a number of active wireless communication connections on ones of said receive frequency sub-bands.

39. The method claimed in claim 37, wherein:
said step of assigning the received signals to receive frequency sub-bands includes the step of assigning the received signals to receive frequency sub-bands having power ranges that encompass the power level of the received signals in response to a predetermined prioritization of said receive frequency sub-bands.

40. The method claimed in claim 34, wherein:
said step of segmenting said predetermined frequency band into a plurality of frequency sub-bands includes defining a plurality of transmit frequency sub-bands, and wherein
said step of assigning the transmit signals includes assigning the transmit signals to transmit frequency sub-bands having power ranges that encompass the power level determined for the transmit signals.

41. The method claimed in claim 40, wherein:
said step of assigning the transmit signals to transmit frequency sub-bands includes the step of assigning the transmit signals to transmit frequency sub-bands having power ranges that encompass the power level of the transmit signals in response to a number of active wireless communication connections on ones of said transmit frequency sub-bands.

42. The method claimed in claim 40, wherein:
said step of assigning the transmit signals to transmit frequency sub-bands includes the step of assigning the transmit signals to transmit frequency sub-bands having power ranges that encompass the power level of the transmit signals in response to a predetermined prioritization of said transmit frequency sub-bands.

43. The method claimed in claim 34, wherein:
said first location includes a multi-channel communications satellite orbiting about a primary body.

44. The method claimed in claim 43, wherein:
said second location includes a footprint region on said primary body associated with said multi-channel communications satellite.

45. The method claimed in claim 34, wherein:
said step of assigning the transmit signals includes determining said power level associated with a transmit side of one of said wireless communication connections and selecting one of said plurality of frequency sub-bands from said plurality of frequency sub-bands for use by said transmit side of said one of said wireless communication connections based on said power level.

46. The method claimed in claim 45, wherein:
said step of assigning the transmit signals includes assigning a CDMA channel within said one of said plurality of frequency sub-bands to said transmit side of said one of said wireless communication connections.

47. The method claimed in claim 34, wherein said step of determining power levels for transmit signals comprises the steps of:
- receiving connection request acknowledge signals from said remote entities in response to said remote entities receiving said connection request signals, said connection request acknowledge signals including transmit power indications indicating power levels of said connection request signals as measured at said remote entities;
- determining power levels for transmit signals for transmit sides of said wireless communication connections with said remote entities in response to said transmit power indications.

48. The method claimed in claim 47, wherein:
said step of determining power levels of received signals includes determining power levels of received signals by measuring power levels of said connection request acknowledge signals.

49. The method claimed in claim 34, wherein said step of determining power levels for transmit signals comprises the steps of:
- transmitting connection request signals to said remote entities at a predetermined transmit power level;
- determining whether connection request acknowledge signals have been received from said remote entities;
- in response to said connection request acknowledge signals not being received from said remote entities, transmitting the connection request signals to said remote entities at an increased transmit power level.

50. The method claimed in claim 49, wherein:
- said step of transmitting the connection request signals at an increased transmit power level includes repeatedly transmitting the connection request signals at successively increased transmit power levels until connection request acknowledge signals are received from said remote entities or the increased transmit power level is equivalent to a maximum transmit power level.

51. The method claimed in claim 34, further comprising the steps of:
- monitoring said power levels of the received signals by measuring said power levels at predetermined intervals during said wireless communication connections to determine whether said power levels have changed; and
- assigning the received signals to new ones of said frequency sub-bands that have power ranges encompassing said measured power levels of the received signals in response to determining that said power levels have changed.

52. The method claimed in claim 34, further comprising the steps of:
- monitoring said power levels of the received signals by measuring said power levels at predetermined intervals during said wireless communication connections to determine whether said power levels have changed; and
- transmitting transmit power modify signals to remote entities in response to determining that said power levels of the received signals received from the remote entities within the wireless cell has changed, the transmit power modify signals instructing the remote entities to modify the transmit power thereof.

53. The method claimed in claim 34, wherein:
said step of specifying a power range for each of said plurality of frequency sub-bands includes respecifying a power range for each of said plurality of frequency sub-bands in response to time.

54. The method claimed in claim 53, wherein:
said step of respecifying a power range for each of said plurality of frequency sub-bands includes respecifying a power range for each of said plurality of frequency sub-bands in response to whether the time is daytime or nightime.

55. The method claimed in claim 53, wherein:
said step of respecifying a power range for each of said plurality of frequency sub-bands includes respecifying a power range for each of said plurality of frequency sub-bands in response to whether the time is a weekday, a weekend day or a holiday.

56. A method for providing multiple access communications between a first location and a second location, said method comprising the steps of:
- providing a predetermined frequency band for a wireless cell at said second location for use in establishing communication connections between said first location and said second location;
- dividing said predetermined frequency band within the wireless cell into a plurality of independent communication channels using at least two different multiple access methods;
- separating said plurality of independent communication channels into a plurality of channel groups;
- specifying a power range for each of said plurality of channel groups, said power range representing a range of signal powers that are to be supported by one of a plurality of channels within each of said plurality of channel groups;
- determining a power level of a signal received at said first location from said wireless cell at said second location; and
- assigning the signal to one of the plurality of channel groups having a power range that encompasses said power level for a receive side of one of said communication connections;
- determining a transmit Rower level for a transmit side of the one of said communication channels; and
- assigning a transmit signal to one of the plurality of channel groups having a power range that encompasses said transmit power level for the transmit side of the one of said communication connections.

57. The method claimed in claim 56, wherein:
said at least two different multiple access methods includes frequency division multiple access (FDMA) and code division multiple access (CDMA).

58. The method claimed in claim 56, wherein:
said at least two different multiple access methods includes frequency division multiple access (FDMA) and time division multiple access (TDMA).

59. The method claimed in claim 56, wherein:
said at least two different multiple access methods includes time division multiple access (TDMA) and code division multiple access (CDMA).

60. The method claimed in claim 56, wherein:
said at least two different multiple access methods includes frequency division multiple access (FDMA), time division multiple access (TDMA), and code division multiple access (CDMA).

61. The method claimed in claim 56, wherein:
said first location includes a multi-channel communications satellite orbiting about a primary body.

62. The method claimed in claim 61, wherein:
said second location includes a footprint region on said primary body associated with said multi-channel communications satellite, said wireless located within said footprint region on said primary body.

* * * * *